Jan. 2, 1940.   L. O. BURT   2,185,830
TRANSMISSION AND GEAR SHIFT MECHANISM THEREFOR
Filed April 2, 1938   4 Sheets-Sheet 1

INVENTOR.
Leo. O. Burt
BY Walter E. Schirmer
ATTORNEY.

Jan. 2, 1940. L. O. BURT 2,185,830
TRANSMISSION AND GEAR SHIFT MECHANISM THEREFOR
Filed April 2, 1938 4 Sheets-Sheet 2
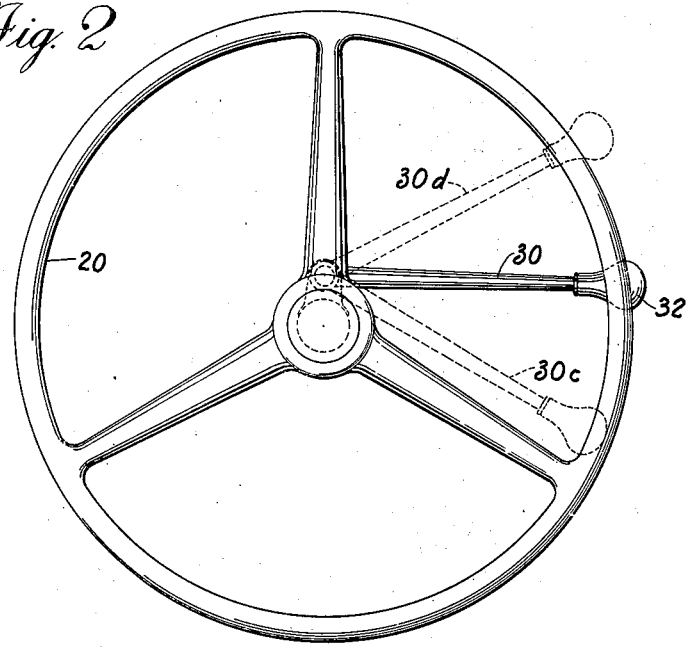
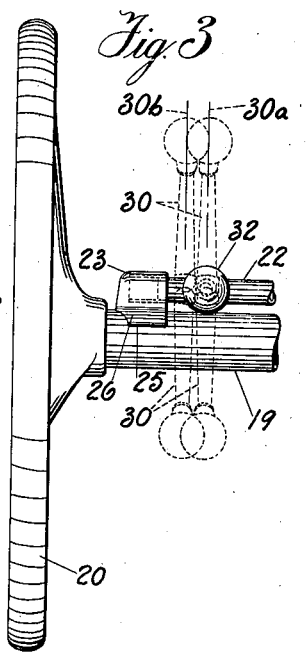
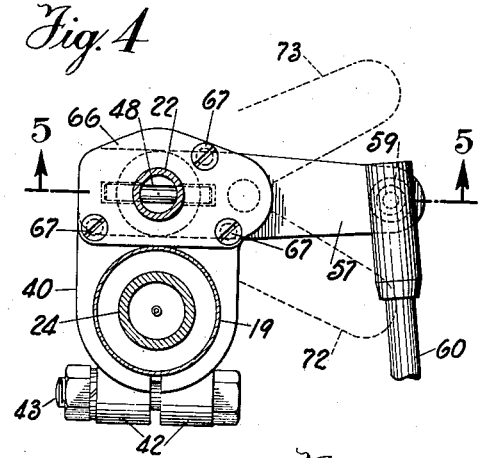
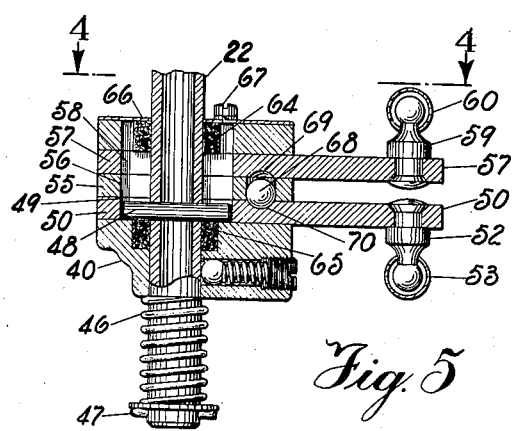
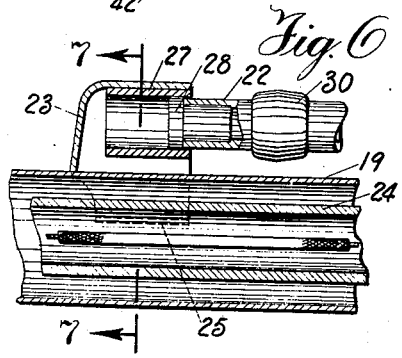
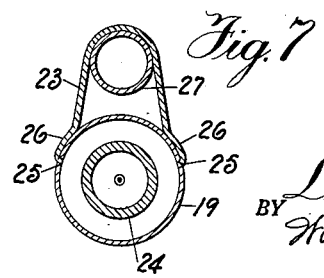
INVENTOR.
Leo O Burt
BY Walter E. Schirmer
ATTORNEY.

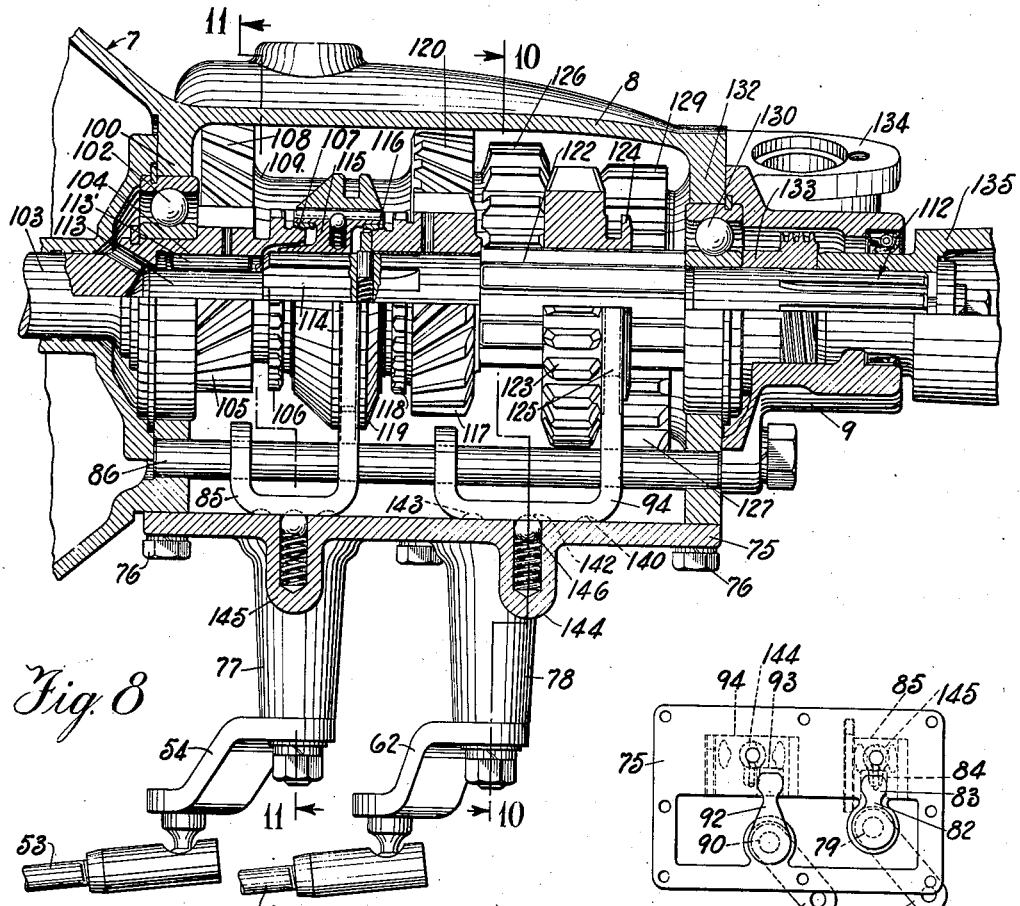

Jan. 2, 1940.  L. O. BURT  2,185,830
TRANSMISSION AND GEAR SHIFT MECHANISM THEREFOR
Filed April 2, 1938  4 Sheets-Sheet 4

INVENTOR.
Leo O. Burt
BY Walter E. Schirmer
ATTORNEY.

Patented Jan. 2, 1940

2,185,830

UNITED STATES PATENT OFFICE 2,185,830

TRANSMISSION AND GEAR SHIFT MECHANISM THEREFOR

Leo O. Burt, South Bend, Ind., assignor to The Studebaker Corporation, South Bend, Ind., a corporation of Delaware Application April 2, 1938, Serial No. 199,559

9 Claims. (Cl. 74—484)

This invention relates to transmissions, and more particularly is directed to transmissions for automotive vehicles and the like and gear shifting means therefor.

The present invention contemplates, broadly, an automotive transmission of a type in which the size and weight of the transmission is materially reduced, and which forms with the engine, a rigid power plant unit. In this connection an integral housing is provided which encases the transmission proper and also provides the bell housing for the clutch, being bolted at its forward periphery to the flywheel housing of the engine unit, the clutch thereby being mounted within the transmission housing. At its rear end suitable means is provided for resiliently supporting the transmission on the vehicle frame, whereby this point of support constitutes one of the three resilient power plant supports, the others being disposed laterally of the forward end of the engine proper.

Such an assembly provides a very compact and closely coupled power unit and the integral housing insures positive alinement of the crankshaft, clutch shaft and the main shaft of the transmission. In addition to this, the entire power plant is inclined rearwardly, thus providing a substantially straight line drive to the rear axle.

In the present construction the selection of the various gear changes at the transmission is accomplished by a novel control mechanism supported on the steering post, and having an actuating member directly beneath the steering wheel.

One of the primary features of the present invention is the elimination of the conventional gear shift lever and its supporting pedestal on the transmission, whereby the upper surface of the housing is substantially free of bosses or vertical extensions.

Another feature of importance is the provision of a shift mechanism involving only one shift rod, which is fixed in the transmission housing, and on which the shifter forks are adapted to have reciprocatory movement. In this connection I provide shifter fork actuating means carried on a plate secured to one lateral side of the transmission and having connection to control means mounted on the steering post for selectively engaging and operating the desired shifter fork.

Still another objective of the present invention is to provide a simplified mechanism under the control of the operator for transmitting the desired selection and movement from adjacent the steering wheel to the shifter means, which mechanism is of a design such as to require few parts, and which operates in a more or less conventional manner.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 2 is a top plan view of the steering wheel and shift actuating mechanism;

Figure 3 is a side elevational view of the structure shown in Figure 2;

Figure 4 is a view taken substantially on line 4—4 of Figure 5 showing the construction at the lower end of the shifting rod;

Figure 5 is a sectional view taken substantially on line 5—5 of Figure 4;

Figure 6 is a sectional view of the mounting at the upper end of the rod shown in Figure 3;

Figure 7 is a sectional view taken substantially on line 7—7 of Figure 6;

Figure 8 is a horizontal sectional view taken through the transmission shown in Figure 1;

Figure 9 is a side elevational view of the side plate construction for the transmission;

Figure 10 is a sectional view taken substantially on line 10—10 of Figure 8;

Figure 11 is a corresponding sectional view taken substantially on line 11—11 of Figure 8;

Figure 1:
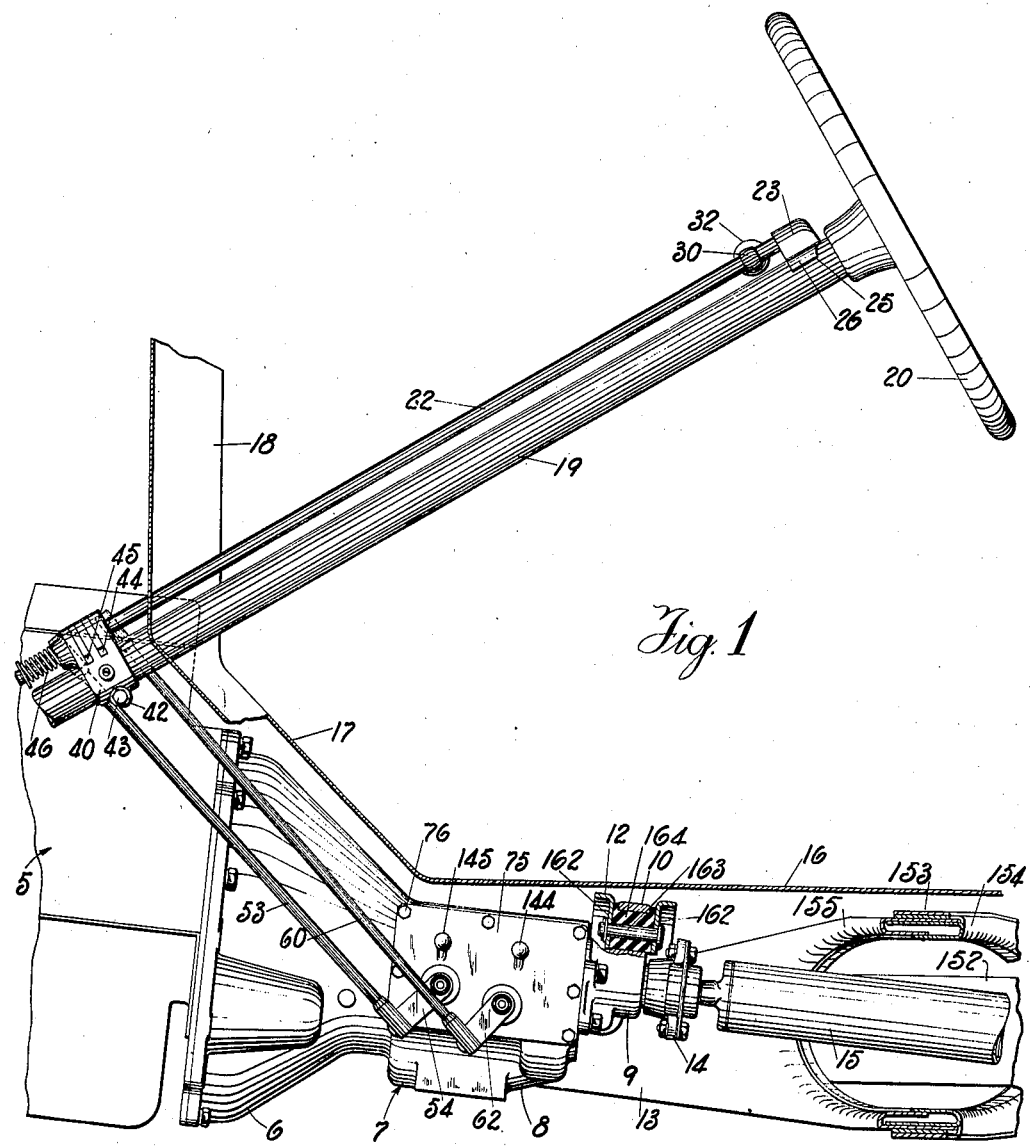
Figure 1 is a side elevational view, partly in section, showing the general arrangement of the present transmission and gear shift construction.
Figure 12:
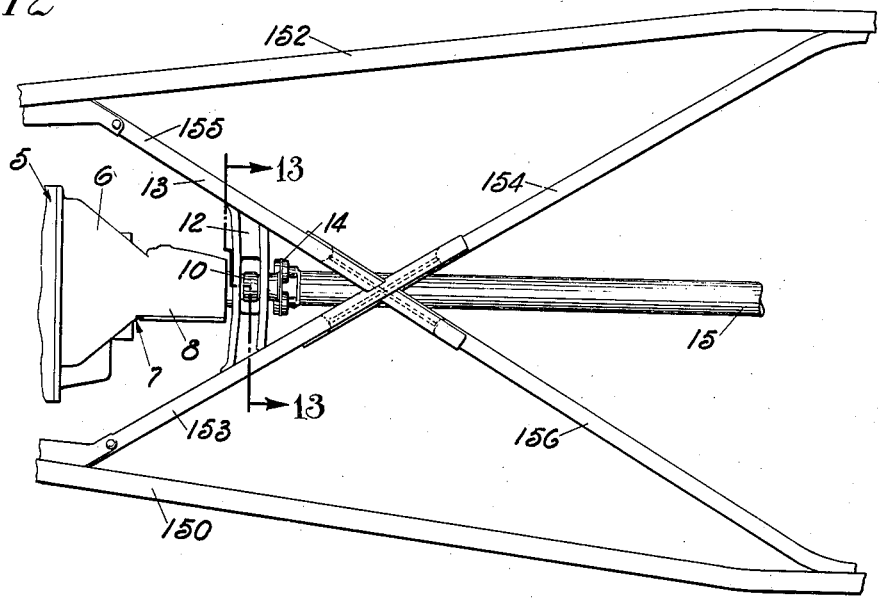
Figure 12 is a top plan view showing the mounting of the transmission mechanism with respect to the chassis of the vehicle.

Referring now in detail to the drawings, the mechanism is shown in its assembled position relative to the body and chassis of the vehicle in Figure 1 with the engine or power plant indicated generally at 5 and having a flywheel housing provided with a pilot flange to which the bell-shaped portion 6 of a unitary clutch and transmission housing indicated generally at 7 is secured. The portion 8 of the housing 7 is adapted to contain the change speed gearing by which the various gear ratios for propelling the vehicle may be effected. At its rear end the housing 7 is provided with a cap member 9 having an upwardly extending portion 10 whereby it is adapted to be mounted on the cross member 12 secured between the adjacent portions 13 of a chassis frame similar to that disclosed in the copending application of Matthews and Churchill, Serial No. 172,114, filed November 1, 1937. A suitable universal coupling 14 is connected to the out-put shaft of the transmission gearing disposed in the housing 8 and connects this shaft to the torque tube 15 by which the drive is transmitted to the rear axle of the vehicle.

It will be noted that the entire transmission and clutch housing, as well as the support for the rear end of the transmission, is disposed below the floor board 16 and the toe board 17 forming the lower surface of the forward compartment of the vehicle. Extending substantially angularly through the junction between the toe board 17 and the bulkhead 18 is a steering post 19 at the upper end of which is rotatably mounted the conventional steering wheel 20.

Extending parallel to and laterally offset from the steering post 19 is a shift member 22 which at its upper end is rotatably supported within a bracket 23 secured to the steering post as indicated in detail in Figures 6 and 7.

Considering these figures, it will be noted that the enclosing tube 19 which forms the enclosure for the steering column 24 is provided with longitudinally slotted portions disposed in circumferentially spaced relation and adapted to receive the inturned ends 25 of the bracket member 23 which is adapted to have wing portions 26 closely embracing and bearing upon the surface of the tube 19 adjacent the slots to provide a rigid support for the bracket 23. The wings 26 of the inturned ends 25 may be welded, brazed or otherwise suitably secured in fixed position to maintain the member 23 against movement.

Secured within the projecting portion of the member 23 is a cylindrical sleeve 27 which is adapted to form a bearing guide for the flanged bushing 28 carried within and suitably secured to the upper end of the shaft 22. The guide 28 is preferably formed of a material such as Tennite and provides for suitable bearing support of the upper end of the shaft within the sleeve 27. It will be noted that the upper end of the sleeve 27 is open so that if air is compressed therein by movement of the guide 28 therethrough this air is free to move outwardly between the sleeve 27 and the surrounding portion of the bracket 23, thus allowing free movement of the shaft 22 longitudinally within the sleeve.

Mounted on and rigidly secured to the shaft 22 adjacent its upper end is a laterally extending arm 30 which has a collar portion welded or otherwise suitably secured about the shaft 22. The arm 30 is provided at its ends with a suitable knob 32 to facilitate gripping thereof and is adapted to be moved by the operator from the neutral position shown in full lines in Figure 2 in opposite directions to either of the dotted line positions shown. This, in turn, results in corresponding rotation of the shaft 22 since the arm 30 is rigidly secured thereto. This arm 30 is also adapted to have movement toward and away from the steering wheel as indicated in dotted lines in Figure 3, being normally urged to a position away from the steering wheel as indicated at 30a in Figure 3 and being movable by the operator toward the steering wheel to a position indicated at 30b. This, of course, results in corresponding axial movement of the shaft 22 with respect to its bearing bracket 23 and produces the selecting action for selecting the desired shifting fork in the transmission housing 8.

Considering now in further detail the mounting of the shaft 22 adjacent the lower portion of the steering post 19 and which is shown in detail in Figures 4 and 5, I preferably provide a split clamp bracket indicated generally at 40 which is adapted to have the end portions 42 clamped about the post 19 by means of the bolt 43 as indicated clearly in Figure 4. The bracket 40 is provided with spaced slotted portions indicated at 44 and 45 in Figure 1 through which the lower end of the shaft 22 is adapted to extend. The shaft 22 is normally supported for bearing engagement in the lower end of the bracket 40 and is urged axially downwardly with respect to the bracket by means of the encircling spring 46 at its lower end which bears against the cross pin 47. The shaft is adapted to receive a selecting pin 48 extending transversely therethrough and which is normally engageable in a transverse slot 49 formed in one shift arm 50 rotatably supported about the shaft 22 within the bracket 40. The arm 50 at its outer end is adapted to receive the stud 52 to which one end of a drag link 53 is connected, the opposite end of this drag link being connected to an arm 54 rotatably supported in the side of the transmission housing 8 as will be described in detail hereinafter.

The intermediate portion 55 between the slots 44 and 45 in the bracket 40 is also provided with a slot 56 allowing axial movement of the shaft 22 therethrough when the pin 48 is in alinement with the slot. Disposed above the intermediate portion 55 is a second shift arm 57 also provided with a transverse slot 58 of a size such as to receive the pin 48 when the shaft 22 has been raised in position by raising of the arm 30 to the position shown at 30b. The outer end of the shift arm 57 is provided with a stud 59 corresponding to the stud 52 and similarly connected through the tie rod 60 to a second arm 62 pivotally supported in the side of the transmission housing. The shaft 22 is sealed against escape of lubricant therefrom by means of the felt packed recesses 64 and 65 formed in the bracket 40 and the upper end of the bracket 40 is preferably closed by means of the plate 66 secured thereto by means of the studs 67.

It will be noted that the intermediate portion 55 of the bracket 40 is provided with a laterally offset opening extending axially therethrough and adapted to receive the ball member 68 which is slightly larger than the axial thickness of the intermediate portion 55. Each of the arms 50 and 57 are provided with arcuate recesses 69 and 70 disposed, when the arms are in neutral position, in alinement with the opening in the intermediate portion 55 in which the ball 68 is disposed. Upon engagement of the pin 48 in the slot 49 of the arm 50 any rotation of the shaft 22 will result in forcing the ball 68 out of the recess 70 and into the recess 69, thereby holding the arm 57 against rotational movement during rotation of the arm 50 under the influence of the pin 48. Similarly when the pin 48 is engaged with the arm 57 the arm 50 will be held against movement by engagement of the ball 68 in the recess 70 thereof.

It is thus apparent that the selection of the arms 50 or 57 is accomplished by the raising of the arm 30 connected with the shaft 22 against the tension of the spring 46 and that the shaft 22 is normally biased by means of the spring into a position such that it is locked for conjoint rotation with the arm 50. Further, by reason of the ball and detent arrangement between the arms 50 and 57 the selected arm will be free to rotate with the shaft 22 while the other arm will be held in neutral position against rotation during this period. It will be apparent that if the arm 30 rotates into either of the dotted line positions shown in Figure 2 it will produce, through the shaft 22 and the pin 48, a similar selected rotation of the arms 50 and 57 depending upon the axial position of the shaft 22. The rotated positions of the arms are indicated in dotted lines at 72 and 73 in Figure 4, while the neutral position is indicated in dotted lines at 72 and 73 in Figure 4, while the neutral position is indicated by the full line showing of the arm 57 in this figure.

Considering now in detail the manner in which the selection for shifting movement of either of the arms 50 or 57 will affect the change speed gearing within the transmission housing 8, attention is directed to the showing in Figure 8 in which it will be noted that while the transmission is closed on its side by a plate member 75 which is secured thereto by means of the studs 76. The plate member 75 is provided with a pair of outwardly extending bosses 77 and 78, the boss 77 containing the shaft 79 to which the opposite end of the arm 54 is connected by means of the nut 80. It will be apparent that swinging movement of the arm 50 into either of of the dotted line positions shown in Figure 4 will result in this movement being transmitted through the tie rod 53 to the arm 54 and will result in a corresponding rotation of the shaft 79.

At its inner end the shaft 79 is provided with an arm 82 which is swaged or otherwise secured thereto and which has an extending rounded projection 83 as shown in Figure 9 engaging in a slot 84 formed in a shifter fork member 85 which is of generally U-shape and which is provided with suitable apertures in each of the legs thereof for guiding the same for longitudinal movement on the fixed shift rail or shaft 86 mounted in the transmission. Thus it will be seen that rotation of the arm 54 in opposite directions will result in causing rotation of the arm 82 to produce opposite longitudinal movements of the shifter fork 85 on the shaft 86.

The boss 78, as shown in Figure 10, is adapted to provide a pivotal support for a shaft 90 which at its outer end is connected to the arm 62 controlled by the shift arm 67 of the shift mechanism and which at its inner end receives the shift arm 92 rigidly secured thereto and engaging in a slot 93 formed in a second separate shifter fork 94 also mounted for longitudinal movement on the shift rail or the shaft 86. Thus corresponding swinging movement of the arm 57 will produce shifting movement of the fork 94 with respect to the shift rail 86.

Considering now the construction of the change speed gearing within the transmission, it will be noted that the housing 7 is composed of an integrally formed clutch and transmission housing and is provided with an intermediate web portion 100 which forms a support for the ball bearing assembly 102 within which the clutch shaft 103 is rotatably journaled. The clutch shaft 103 is provided with an enlarged hollowed end 104 terminating in an external helical gear portion 105 and an axially spaced clutch tooth portion 106 provided with a frusto-conical synchronizing surface 107. The gear 105 is adapted to be in constant meshing engagement with the gear portion 108 of a compound gear sleeve 109 rotatably supported on the countershaft 110.

The output shaft of the transmission is indicated generally at 112 and at its inner end is provided with a reduced portion 113 upon which the needle bearings 113' are disposed for rotatably journaling this shaft in the outer end of the clutch shaft. Adjacent the reduced end 113 of the shaft 112 there is provided a splined portion 114 upon which is supported the synchronizing sleeve member 115, this sleeve member having slightly axial movement on the splined portion 114 of the shaft to selectively move the corresponding frusto-conical friction surfaces into engagement with the surface 107 or the surface 116 of a second gear member 117 rotatably mounted upon the shaft 112 and having an integral clutch tooth portion 118. Mounted on the sleeve 115 is a clutch collar 119 which has meshing engagement therewith and which is axially slidable with respect thereto for coupling the clutch tooth portions 107 or 118 of the gears 105 or 117 to the sleeve 115 and thereby clutching these gears to the shaft 112. Suitable ball means is springpressed into engagement between the collar 119 of the sleeve 115 so that initial axial movement of the collar 119 under the influence of the shifter fork 85 will result in frictional engagement of the sleeve 115 with either of the friction surfaces 107 or 116 of the respective gear members thereby bringing these gears to a speed synchronous with that of the shaft 112 so that thereafter the clutch collar 119 may be axially shifted to clutch the sleeve to either the clutch teeth 107 or 118.

The gear 117 is adapted to have constant meshing engagement with a second gear portion 120 mounted on the countershaft 110 whereby engagement of the clutch collar 119 with the clutch teeth 118 will result in the drive being transmitted from the clutch shaft 103 through the gears 105 and 108 and back to the shaft 112 through the gears 120 and 117 and the clutch sleeve 115. This is the conventional second speed of an automotive vehicle and in detail forms no part of the present invention. Similarly, when the clutch collar 119 is engaged with the clutch teeth 107 the clutch shaft 103 is directly coupled to the transmission shaft 112 and consequently the gears 120 and 117 merely idle in meshing engagement without transmission of any torque therethrough. This is the conventional direct or third speed drive of the transmission.

Mounted on an enlarged splined portion 122 of the shaft 112 is the spur gear 123 having an integrally formed hub portion 124 defining an annular groove which is adapted to receive the extending end 125 of the shifter fork 94. The gear 123 is axially shiftable upon the splined portion 122 of the shaft 112. Upon movement of the shifter fork upon the shift rail 86 forward movement of the shifter fork 94 results in movement of the gear 123 into engagement with the gear section 126 of the countershaft and therefore results in drive being transmitted to the transmission shaft 112 through the gears 105 and 108 and thence back to the shaft through the gears 126 and 123. This is the conventional low speed of the transmission.

Similarly, when the gear 123 is shifted rearwardly on the splined portion 122 it is adapted to move into engagement with an idler gear 127 mounted on an idler shaft 128 carried in an arcuately recessed portion of the transmission as indicated clearly in Figure 10, which idler gear 127 has meshing engagement with the small pinion like gear 129 carried on the countershaft 110. This results in reverse drive through the transmission from the gears 105 and 108 to the gear 129 and thence through the gear 127 to the gear 123.

The rear end of the transmission shaft 112 is supported for rotation in the bearing assembly 130 supported in the rear web portion 132 of the transmission housing 8. A suitable bearing cap 9 is bolted to the rear end of the transmission and encloses the speedometer gear 133 mounted on the extending end of the shaft and which is adapted to drive a suitable speedometer mechanism extending outwardly through the boss 134. At its outer end the shaft is adapted to receive the hub of the companion flange 135 forming a part of the universal coupling 14 described in connection with Figure 1.

Considering now the manner in which the selection of the various speed ratios in the transmission is effected from the lever 30, it should be noted first that the lever is normally held in the position shown at 30a in Figure 3 by means of the spring 46 with the lever in the neutral position.

To start the shifting movement the lever is raised to the position shown by the line 30b, then rotated downwardly from its full line position shown in Figure 2 into the position shown at 30c in Figure 2. This results in engagement of the pin 48 in the slot 58 of the arm 57 and rotation of the arm 30 results in the arm 57 being rotated in a clockwise direction as shown in Figure 4 into the dotted line position shown at 72. This results in a thrust being imposed on the tie rod 60 which rotates the arm 62 in a counterclockwise direction and thereby moves the shifter fork 94 from the position shown in Figure 8 into a position such that the gear 123 is moved into meshing engagement with the gear 126.

It will be noted that the shifter fork 94 is provided with arcuate recesses 140, 142 and 143 opening toward the inner face of the plate 75 and that the plate is provided with suitably recessed bosses 144 and 145, the boss 144 carrying the spring-pressed ball member 146 which is adapted to engage in the recess 142 when the shifter fork 94 is in neutral position. When it has been shifted as just described, the ball 146 snaps into engagement in the recess 140 and thus holds the shifter fork 94 in shifted position. This results in low speed drive through the transmission from the gears 105 and 108 through the gears 126 and 123 to the shaft 112.

If it should be decided to reverse the direction of movement of the vehicle, the arm 30 would be raised to its position at 30b and then be rotated in a counterclockwise direction as indicated in Figure 2 to the dotted line indicated at 30d. This would result in a counterclockwise rotation of the arm 57 to the position shown at 73 which in turn would result in rearward movement of the shifter fork 54 to engage the gear 123 with the idler gear 127 driven from the gear 129 and therefore impart a reverse direction of rotation to the shaft 112.

Considering now that the transmission is in low gear with the vehicle proceeding forwardly and it is desired to shift into second gear, the clutch pedal is depressed and the arm 30 moved from the position shown at 30c to its full line position and the arm 57 thus returns to neutral position with respect to the bracket 40. As the arm 30 reaches its neutral position the upward pressure of the operator's fingers tend to hold the lever in the position shown at 30b and the release of the lever 30 moves it downwardly under the influence of the spring 46 to a position shown at 30a in Figure 3. It is then rotated in a counterclockwise direction to a position shown at 30d. This has resulted in the pin 48 moving into engagement with the slot 49 of the arm 50 and the rotation of this arm in a counterclockwise direction to a position such as is indicated at 73 in Figure 4. At the same time the movement of the arm from the position shown at 30c in Figure 2 has moved the shifter fork 94 to a neutral position with the gear 123 out of engagement with either of the gears 126 or 127. Upon movement of the arm 30 in a counterclockwise direction a tension is imposed upon the tie rod 53 which tends to rotate the arm 54 in a counterclockwise direction thereby moving the shifter fork 85, which is detent controlled in the same manner as the fork 94, from its neutral position to a position in which the clutch sleeve 119 is in engagement with the clutch teeth 118, thus coupling the gear 117 to the member 115 for conjoint rotation between the gear 117 and the shaft 112. Thus the transmission has been shifted into second or intermediate speed.

In order to shift to direct or high speed the operator merely moves the lever 30 from the position shown at 30d in Figure 2 in a clockwise direction to the position shown at 30c. Inasmuch as the spring 46 maintains the pin 48 in the slot 49 the arm 50 is rotated from a position indicated at 73 to the position indicated at 72 which imposes a thrust upon the tie rod 53 and rotates the arm 54 in a counterclockwise direction to shift the fork 85 from one of its extreme positions to the opposite extreme position thereby moving the shift collar 119 forwardly into engagement with the clutch teeth 107 to couple the clutch sleeve 118 directly to the clutch shaft 103.

It will thus be apparent that the movement of the shift arm 30 in the steering wheel is substantially similar to the conventional type of shifting movement employed in passenger vehicles and that the spring pressure of the spring 46 is so arranged that a normal shifting movement from low speed toward reverse will result in the spring moving the shaft 22 downwardly as the arm 30 reaches neutral position so that a direct shift into reverse is not possible unless the operator maintains considerable upward pressure on the arm 30. The location of the knob 32 adjacent the periphery of the steering wheel assures convenient manipulation of the arm 30 and also allows the operator to complete the shifting movement without removing his hand entirely from the steering wheel. The pivotal mounting of the shaft 22 at its upper and lower ends insures positive alinement of the shaft with respect to the arms 50 and 57 so that the pin will always move into proper engagement therewith upon the desired actuation of the shaft 22 while the ball 68 prevents any possible movement of the unselected arm while the other arm is being shifted.

It is also apparent that by the provision of the two arms 54 and 62 on the side plate 75 the entire shifting mechanism can be removed with the side plate without in any way affecting the transmission or the mounting of the shifter forks 85 and 94 on the shift rail 86. This allows for inspection, repair and replacement of any of the component parts of the mechanism and insures a simple and economical design which can be readily assembled to the transmission.

Considering now in detail the mounting of the rear end of the transmission on the frame it will be noted that the side rails 150 and 152 of the frame are tied together by cross members consisting of oppositely turned, overlapping channels 153 and 154 forming one strut of the cross member and corresponding channels 155 and 156 forming the opposite strut of the cross member.

Figure 13:
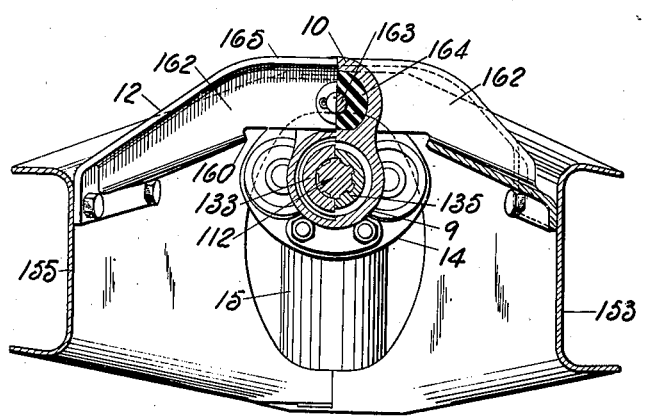
Figure 13 is an enlarged sectional view taken substantially on line 13—13 of Figure 12.

Disposed transversely between the channel members 155 and 153 is a substantially channel-shaped member 12 which at its central arched portion has a web thereof cut away as indicated at 160 and has downturned flanges 162 between which is disposed a cross pin 163. The pin 163 is provided with a rubber bushing thereabout as indicated at 164 in Figures 1 and 13 which is enclosed within the upper portion 10 of the bearing cap 9 whereby the bearing cap 9 is suspended by a resilient rubber support upon the pin 163 carried by the cross member 12.

It will be noted that the collar portion of the bearing cap 9 is of less axial extent than the space between the flanges 162 whereby the rubber bushing 164 is provided with radial flanges which provide for axial cushioning of the member 10 with respect to the side flanges 162 as well as providing resilient radial support of the member 10 upon the pin 163. The bracket member 12 may be a structural member and is preferably provided with peripheral flanges 165, for strengthening the same against lateral displacement. It may be welded, bolted or otherwise rigidly secured to the adjacent web faces of the channel members 153 and 155 and forms a rigid cross brace therebetween.

It is thus apparent that by this suspension the transmission is free to have rocking movement about the pin 163 as a center due to any lateral thrust or displacement and is radially and axially cushioned with respect to its support on the rubber bushing 164 disposed between the side flanges 162 and within the hub portion 10 of the one piece cap 9, thereby insulating the housing 7 from the frame. It will be apparent that a three way suspension of the entire power plant can be provided with the structure shown in Figures 1, 2 and 13 coupled with the conventional rubber mounted side or lateral supports at the forward end of the engine 5. This insures that lateral side sway of the body with respect to the frame will not in any manner affect the transmission or the power plant due to the presence of any projections from the transmission upwardly through the floor board 16. Similarly, the transmission is so cradled with respect to the chassis of the vehicle as to provide a substantially direct line of drive to the differential pinion at the rear axle.

It is therefore believed that I have provided a simplified type of gear shifting mechanism for transmissions of this type which in conjunction with the cradling of the transmission in the manner specified allows relative rocking movement of the body with respect to the transmission or of the transmission with respect to the chassis of the vehicle. Due to the universal joint connections at opposite ends of the tie rods 53 and 60 it is apparent that a limited amount of movement of the transmission with respect to the steering column can be provided without in any way disturbing the selection and actuation of the various change speed gear ratios in the transmission.

I am aware that various changes may be made in certain details of construction and operation of the illustrated form of my invention and I therefore do not intend to be limited except as defined by the scope and spirit of the appended claims.

I claim:

1. A transmission comprising a housing having an open side, change speed gearing therein, a fixed rod extending longitudinally along said side of said housing, a pair of independent shifter forks mounted for reciprocatory movement on said rod and engaging shiftable portions of said gearing, said forks having notched portions lying in the plane of said side, a plate closing said side and having spaced outwardly projecting journal portions, a pair of arms pivotally mounted in the said journal portions and having ends each engaging in the notched portion of one of said forks, and means controlled from a remote point for selecting either of said arms and rotating the selected arm in either direction from an intermediate portion.

2. A transmission comprising a housing, change speed gearing in said housing, a side plate closing one lateral side of said housing, a pair of shafts extending through said plate and having arms rigidly secured to the inner ends thereof, a rod in said housing extending parallel to said plate, J-shaped shifter forks mounted for sliding movement on said rod having planar base portions lying against said plate and engaged by said arms for selectively changing the speed ratios in said transmission, a remotely disposed shift rod having axial and rotational movement, and means responsive to axial movement of said rod for selectively engaging one of said shafts.

3. In combination, a transmission housing having an open side, a planar plate normally closing said side, a rod in said transmission extending parallel to said plate, shifter forks having U-shaped base portions providing axially spaced bearing support on the rod to accommodate reciprocatory movement of said forks thereon, said base portions having planar surfaces intermediate the bearing support engaging the inner face of said plate to prevent rotation of said forks about said rod.

4. The combination of claim 3 further characterized by the provision of ball detents carried in said plate and engageable in recesses in the engaging portions of said planar surfaces to restrain said forks in selected positions.

5. In combination, a transmission housing having an open side, a plate secured to and closing said side, said plate having normally projecting journals, shafts in said journals having arms secured to the inner ends thereof and lying against the inner face of said plate, a rod in said transmission spaced from and extending parallel to said plate above the arms, shifter forks in said transmission having U-shaped end portions bearing against the inner face of said plate and having the leg portions thereof journalled on said rod to provide spaced bearing supports accommodating reciprocatory movement of said forks on said rod, and notches cut in the plate-bearing portions of said forks receiving the ends of said arms to effect shifting of said forks upon selective rotation of said shafts.

6. In combination, a transmission housing having a main shaft, a plurality of gears shiftable axially on said shaft, said transmission having an open side laterally of said shaft, a rod fixed in said transmission intermediate said shaft and said side, shift forks engageable with said gears extending normal to said shaft and rod and having U-shaped ends through which said rod extends providing axially spaced bearing support preventing binding of said forks when shifted axially along the rod, the portion intermediate said support being disposed in the plane of said opening, a plate closing said opening and having engagement with said intermediate portion preventing any tendency of said forks to rotate about said rod, and means carried by said plate for selectively shifting said forks.

7. In combination, a transmission, means including two arms carried on one side of said transmission for selectively shifting gears therein, a steering post, a pair of brackets spaced longitudinally on the post and forming laterally offset alined bearings, a rod journalled for reciprocation and rotation in said bearings and having a rigid normally extending arm portion adjacent the upper end thereof, the lower bracket having two axially spaced normally extending levers, motion transmitting means between each lever and its respective arm, each of said levers having a hub portion receiving said rod and provided with a diametrical slot, and a transverse pin carried by said rod and operable upon selective axial movement of the rod to engage in the slot of one lever to key it to said rod for conjoint rotation therewith, said bracket having a similar fixed slotted portion intermediate said levers whereby said rod must be in predetermined position to be moved axially.

8. In combination, a transmission, means including two arms carried on one side of said transmission for selectively shifting gears therein, a steering post, a pair of brackets spaced longitudinally on the post and forming laterally offset alined bearings, a rod journalled for reciprocation and rotation in said bearings and having a rigid normally extending arm portion adjacent the upper end thereof, the lower bracket having two axially spaced normally extending levers, motion transmitting means between each lever and its respective arm, each of said levers having a hub portion receiving said rod and provided with a diametrical slot, a transverse pin carried adjacent the lower end of said rod selectively engageable in the slots of said levers upon axial movement of the rod to couple the rod and selected lever for conjoint rotation, and means in said lower bracket intermediate said lever hub portions preventing axial movement of said rod except in an intermediate rotated position whereby said levers are returned to neutral position prior to any axial shifting of said rod.

9. In combination, a steering post, upper and lower laterally projecting brackets having alined bearing portions, a rod mounted for axial reciprocation and rotation in said bearing portions and having an arm rigidly connected thereto at the upper end thereof, a pair of axially spaced levers journalled about said rod in said lower bracket separated by a fixed intermediate portion of said bracket, said levers and intermediate portion having radial slots adapted to be in alinement when the levers are in neutral position, and a transverse pin in the lower end of said rod operable to selectively engage in the lever slots upon axial movement of the rod, said intermediate portion forming a means preventing axial shifting of said rod except when in neutral position and insuring return of said levers to neutral position prior to uncoupling or coupling engagement of said pin therewith.

LEO O. BURT.